United States Patent
Wiedenhoefer

(10) Patent No.: US 12,078,429 B2
(45) Date of Patent: Sep. 3, 2024

(54) TRIANGULAR FLOW PASSAGE HEAT EXCHANGER

(71) Applicant: Raytheon Technologies Corporation, Farmington, CT (US)

(72) Inventor: James F. Wiedenhoefer, Windsor, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/862,740

(22) Filed: Jul. 12, 2022

(65) Prior Publication Data

US 2024/0019215 A1    Jan. 18, 2024

(51) Int. Cl.
| | |
|---|---|
| F28F 3/00 | (2006.01) |
| F28D 9/00 | (2006.01) |
| F28F 3/02 | (2006.01) |
| F28F 13/12 | (2006.01) |

(52) U.S. Cl.
CPC ............ F28D 9/0062 (2013.01); F28F 3/025 (2013.01); F28F 13/12 (2013.01)

(58) Field of Classification Search
CPC .... F28F 13/12; F28F 3/025; F28F 1/16; F28F 1/04; F28F 1/26; F28F 1/325; F28F 1/32; F28F 1/126; F28F 2215/00; F28F 3/00; F28F 3/048; F28F 2215/10; F28F 2275/061; F28F 2255/18; F28F 2275/04; F28F 2275/02; F28D 9/0062; F28D 1/0477; F28D 9/00; F28B 1/06
See application file for complete search history.

(56) References Cited

U.S. PATENT DOCUMENTS

| | | | |
|---|---|---|---|
| 4,501,321 A * | 2/1985 | Real | F28D 9/0031 138/171 |
| 8,122,909 B2 | 2/2012 | Tonkovich et al. | |
| 2003/0009883 A1* | 1/2003 | Thors | F28F 1/40 29/890.03 |
| 2013/0087318 A1* | 4/2013 | Nakano | F28F 1/126 165/181 |
| 2020/0370834 A1* | 11/2020 | Fukada | F28F 3/027 |

FOREIGN PATENT DOCUMENTS

| | | |
|---|---|---|
| EP | 0448991 A2 | 10/1991 |
| JP | 2005069499 A * | 3/2005 |
| JP | 2020012621 A * | 1/2020 |
| SU | 756178 A1 * | 8/1980 |
| SU | 1575063 A1 | 6/1990 |
| WO | 2018/177443 A1 | 10/2018 |

OTHER PUBLICATIONS

Extended European Search Report dated Oct. 31, 2023 for corresponding application EP23184003.4.

* cited by examiner

Primary Examiner — Harry E Arant
(74) Attorney, Agent, or Firm — Bachman & LaPointe, P.C.

(57) ABSTRACT

A heat exchanger element has upper and lower walls defining upper and lower flow surfaces of a flow path; turbulators on the upper and lower flow surfaces; and a fin pack between the upper and lower surfaces, the fin pack having alternating angled walls extending between the upper and lower surfaces to define triangular flow passages in the flow path between the upper and lower walls. A heat exchanger stack can have multiple layers of the heat exchanger element, and a method for making the heat exchanger is disclosed. The structure produces advantageous flow characteristics.

18 Claims, 5 Drawing Sheets

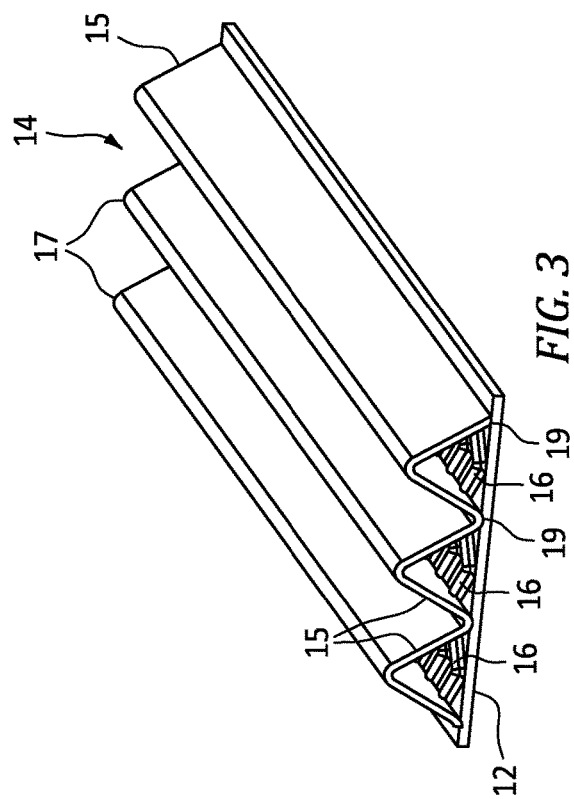
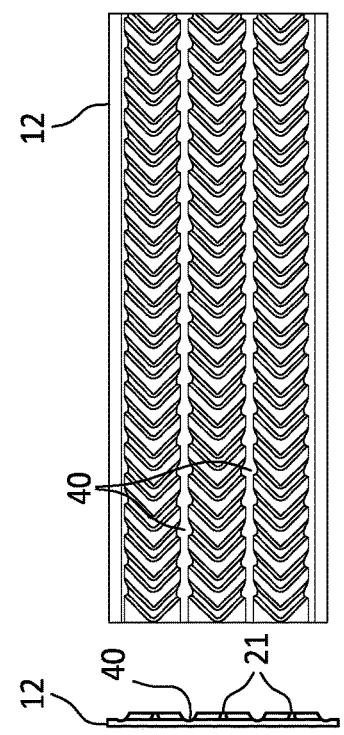
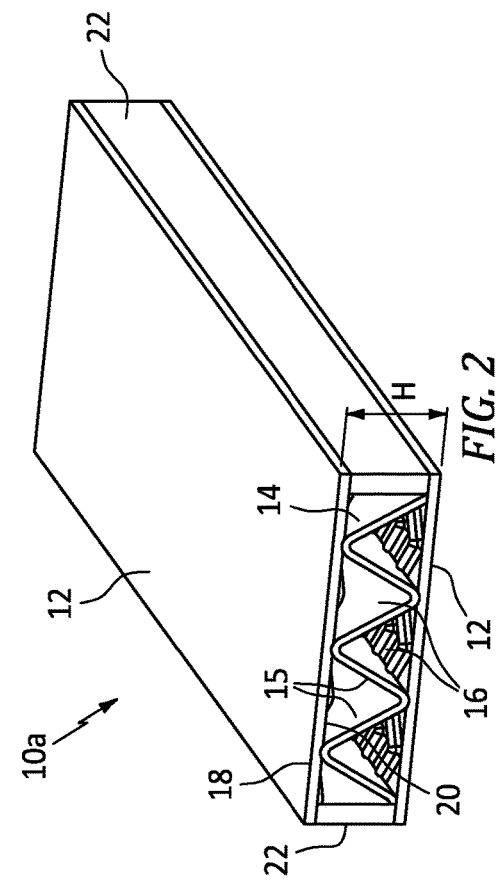
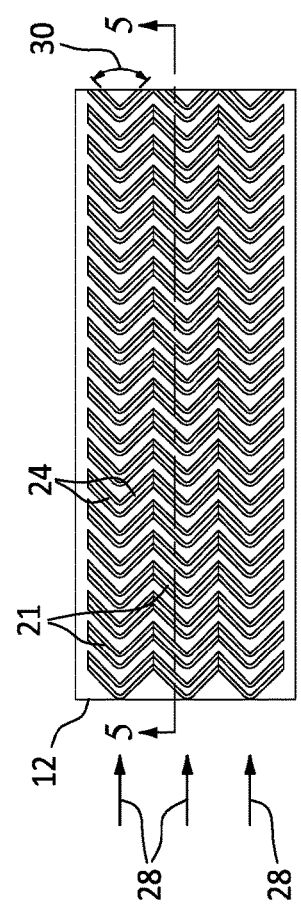
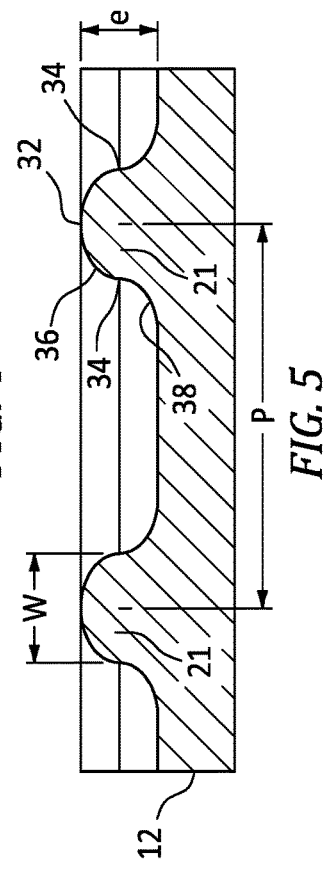

TRIANGULAR FLOW PASSAGE HEAT EXCHANGER

BACKGROUND

The present disclosure relates to heat exchangers.

Conventional heat exchangers can be cast and feature rectangular flow passages. The parting surfaces of such heat exchangers can be provided with flow turbulators that can be configured to generate a vortex flow. Side walls of this structure are smooth, with a purpose primarily to control the shape of the vortex and structural rigidity. Such a design can produce a generally high heat transfer coefficient (HTC), but produces a low surface area.

Known plate-fin heat exchangers involve fins between enclosing walls. This produces a low HTC but an overall high density of thin fins leading to high surface area.

High temperature and high pressure heat exchangers may frequently be constructed by casting, specifically cored investment casting. In such casting, the core tends to float, leading to the need for wall control, and even so also leading to thick walls that are thicker than necessary and therefore are both heavier and bulkier than is desired, for example in aviation applications. Thus, the need remains for a heat exchanger that provides good HTC and surface area, and which does so in a potentially more compact and less heavy structure.

SUMMARY

In one non-limiting embodiment, a heat exchanger element, comprises upper and lower walls defining upper and lower flow surfaces of a flow path; turbulators on the upper and lower flow surfaces; and a fin pack between the upper and lower surfaces, the fin pack comprising alternating angled walls extending between the upper and lower surfaces to define triangular flow passages in the flow path between the upper and lower walls.

In a further non-limiting configuration, the heat exchanger further comprises side walls extending between the upper and lower walls to collectively define the flow path.

In a still further non-limiting configuration, the turbulators are in the shape of a chevron, a broken-V, or combinations thereof.

In another non-limiting configuration, the turbulators are oriented along a centerline of the triangular flow passages defined by adjacent walls of the fin pack and the upper or lower surface.

In still another non-limiting configuration, arms of the chevron or the broken-V are centered along the centerline of the triangular flow passages, and define an angle between the arms of between 60 and 120°.

In a further non-limiting configuration, the angle is measured facing downstream with respect to flow through the triangular flow passages.

In a still further non-limiting configuration, the turbulators are defined by at least one ridge having a square, full-round shape.

In another non-limiting configuration, the square, full-round shape is defined by a top surface and two side surfaces, wherein transition between the top surface and the two side surfaces is rounded, and wherein transition from the two side surfaces to the upper or lower flow surface is rounded.

In still another non-limiting configuration, a distance between the two side surfaces defines a width (w) of the turbulator, and the width is equal to a turbulator height (e), and wherein the transition from the two side surfaces to the top surface has a top fillet radius equal to one-half of the turbulator height (e/2).

In a further non-limiting configuration, the turbulators have a turbulator height to passage height ratio, e/H, between 0.10 and 0.30.

In a still further non-limiting configuration, a ratio of pitch (P) of the turbulators in a flow direction to height (e) of the turbulators (P/e) is between 5 and 10.

In another non-limiting configuration, the alternating angled walls define an angle between adjacent walls of between 45 and 75 degrees.

In still another non-limiting configuration, the alternating angled walls define an angle between adjacent walls of between 50 and 70 degrees.

In a further non-limiting configuration, the alternating angled walls define upper and lower ridges where adjacent walls meet, and the upper and lower flow surfaces have grooves for receiving the upper and lower ridges.

In a still further non-limiting configuration, the upper and lower walls contain passages for further fluid flow.

In another non-limiting configuration, a heat exchanger stack comprises a plurality of heat exchange layers defining heat exchange fluid flow passages.

In still another non-limiting configuration, a method for making a heat exchanger comprises the steps of: placing a fin pack comprising alternating angled walls on a lower wall having turbulators, a lower groove being defined in the lower wall to receive a lower ridge defined by adjacent walls of the fin pack; placing an upper wall on the fin pack, an upper groove being defined in the upper wall to receive an upper ridge defined by adjacent walls of the fin pack; placing side walls between the upper wall and the lower wall to define an assembled heat exchanger; and bonding the assembled heat exchanger.

In a further non-limiting configuration, the method further comprises placing braze in the upper and lower grooves before the bonding step.

In a still further non-limiting configuration, the upper wall and the lower wall are forged and then etched to produce the turbulators on flow surfaces of the upper wall and the lower wall.

In another non-limiting configuration, the method further comprises grinding or machining the upper groove and the lower groove into the upper wall and the lower wall.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 2 illustrates a layer or component of a heat exchanger as disclosed herein;

FIG. 3 illustrates a lower wall and fin pack of the heat exchanger of FIG. 2;

FIGS. 4-7 illustrate features of an upper or lower wall of a heat exchanger as disclosed herein;

DETAILED DESCRIPTION

The present disclosure relates to heat exchangers, especially heat exchangers for use in industrial equipment and machinery and aircraft.

Figure 1:
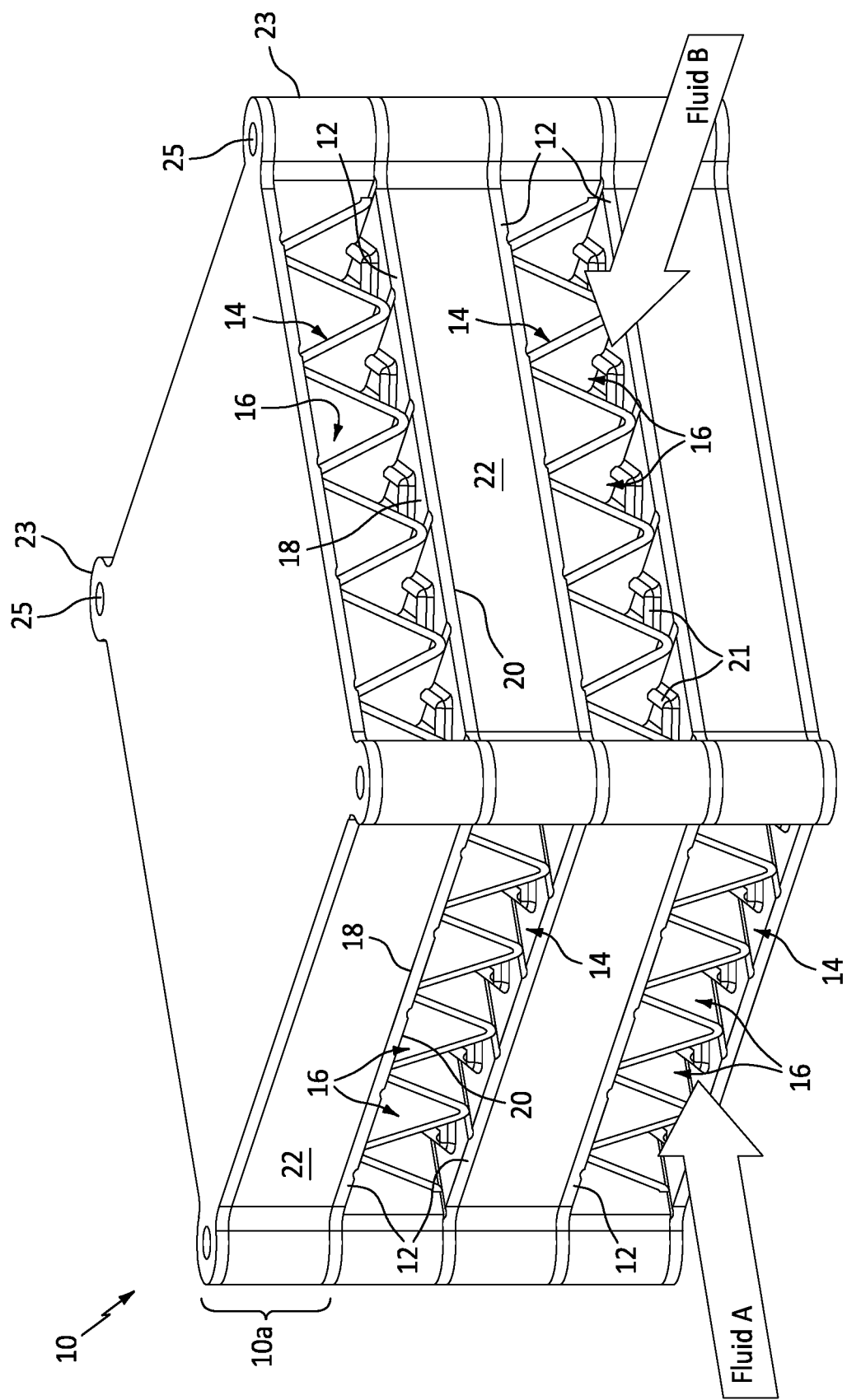
FIG. 1 illustrates a non-limiting configuration of a heat exchanger as disclosed herein.

FIG. 1 illustrates a heat exchanger or heat exchanger stack 10 for exchanging heat between flows of Fluid A and Fluid B. Flow passages are defined for these fluids by heat exchanger layers 10a (See also FIG. 2) each having two plates 12 and a fin pack 14 disposed between plates 12. The combination of fin pack 14 and plates 12 creates triangular flow passages 16. The flow surfaces of plates 12 and angles of fin pack 14 are configured to provide a desirable flow with excellent heat transference with minimal pressure drop. The heat exchanger configuration of FIG. 1 is one non-limiting configuration showing a single-pass, cross-flow configuration. It should be apparent that other configurations, such as counter-flow or multi-pass, may be configured using similar overall constructions, some of which are discussed below.

FIG. 3 illustrates a fin pack 14 on only a lower plate 12, and with upper plate 12 removed or not yet installed. As shown, fin pack 14 can be a sheet of suitable material folded or otherwise configured into a series of adjacent angled walls 15 defining upper corners or ridges 17 and lower corners or ridges 19. In FIG. 3, fin pack 14 is positioned on a plate 12, and three triangular flow passages 16 are defined by plate 12 and walls 15 of fin pack 14. It should be appreciated that with the mounting or positioning of an upper plate 12, a further plurality of triangular flow passages with the triangle base oriented upwards will be defined as shown in FIGS. 1 and 2. Adjacent walls 15 of fin pack 14 define an angle between them of between 45 and 75 degrees. In a further non-limiting configuration, this angle can be between 50 and 70 degrees.

Figure 8:
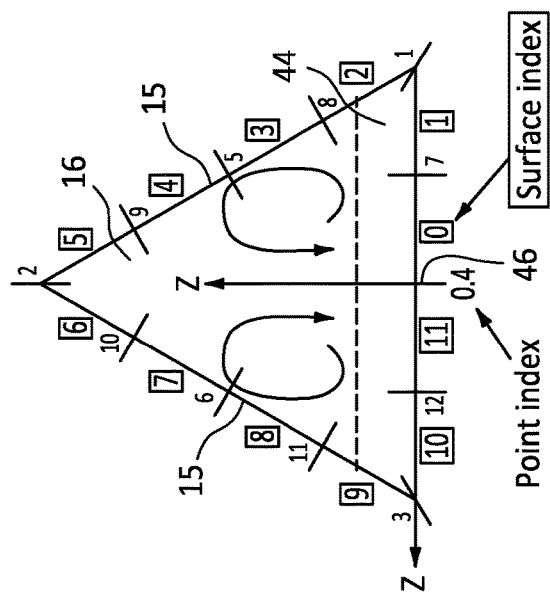
FIG. 8 schematically illustrates the vortex structure through a triangular and turbulated flow passage as disclosed herein.
Figure 9:
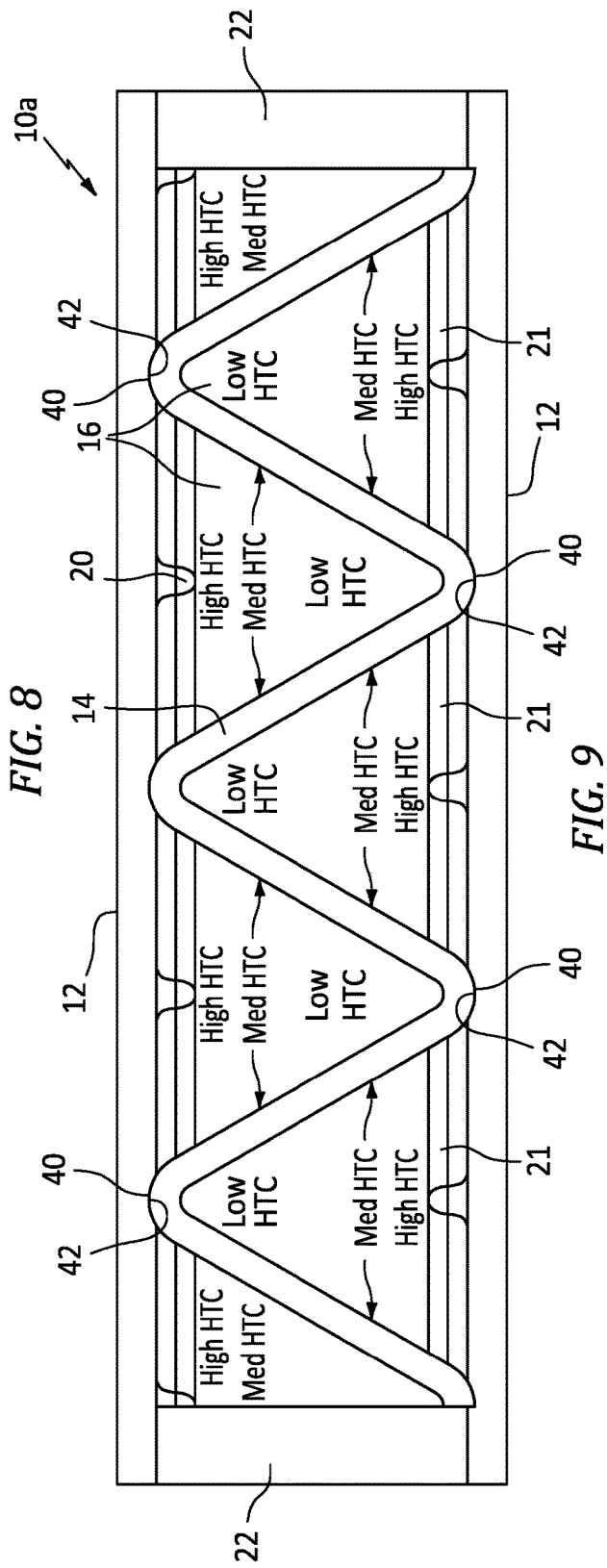
FIG. 9 illustrates thermal heat transfer coefficient details through a heat exchanger as disclosed herein.

In the heat exchanger disclosed herein, it has been found that excellent flow characteristics can be obtained with turbulator structures 21 on plates 12 with substantially smooth walled fin packs 14. This leads to flow characteristics that will be further discussed below, but which are illustrated in FIGS. 8 and 9.

Plates 12 in the configuration of FIG. 1 define flow passages on both upper and lower surfaces. Thus, plates 12 can have an upper flow surface 18 having turbulators 21 disposed thereon (FIG. 4), and similar structures on the lower surface 20 (FIG. 1) with the exception that in this configuration, where flow in the next layer down will be cross flow, the turbulators on lower surface 20 would be oriented transverse to those on the upper flow surface 18.

In the configuration of FIG. 1, heat exchanger layers 10a of heat exchanger 10 are arranged in alternating fashion to define a cube or box shape having heat exchange flow paths for each of fluids A and B, in a cross-flow arrangement. In such a configuration, each plate 12 separates flow A in one layer from flow B in an adjacent area. Thus, in this configuration, each plate 12 has upper flow surface 18 with turbulators 21 and lower surface 20 also with turbulators 21. Upper flow surface 18 defines a lower boundary of a triangular fluid flow passage above plate 12, and lower surface 20 defines an upper boundary of triangular fluid flow passages below plate 12. Further, in this configuration, an assembly of fin pack 14 between plates 12 defines an array of adjacent triangular fluid flow passages 16 arranged in alternating fashion between triangular fluid flow passages 16 defined along a lower plate 12 and fluid flow passages 16 defined along an upper plate 12.

As shown in FIGS. 1 and 2, side walls or bars 22 can be deployed between upper and lower plates 12 to fluidically isolate adjacent flows from each other by closing off the sides of a defined flow array. In the embodiment of FIG. 1, side walls 22 as well as plates 12 have corner extensions 23 that can have openings 25 to allow stack 10 to be secured, for example with a post or rod (not shown) through the aligned openings 25. Still referring to FIG. 1, stack 10 also has a top and bottom plate 12 that will have turbulators only on one side, and are flat or smooth on the outermost side.

FIG. 4 shows a top view looking down, or bottom view looking up, at a surface of a plate 12, and shows turbulators 21 in the form of repeating chevron or V-shaped ridges having arms 24 that are angled relative to a flow direction 28 along plate 12. Once fin pack 14 is in place, arms 24 will extend to either side of a centerline of the triangular flow passage and define an angle 30 between arms 24 that can be between 60 and 120 degrees. Angle 30 opens in a downstream direction as measured with respect to flow 28 through the triangular flow passage 16. In one non-limiting configuration, angle 30 can be about 90 degrees. Alternatively, in another non-limiting configuration, turbulators can be in the form of a broken-V, also referred to as a discrete V, in other words, with the arms of the V displaced relative to each other to not meet at a centerline point. Other configurations can also be utilized.

FIG. 5 is an enlarged cross section taken along the lines 5-5 in FIG. 4 to further illustrate one non-limiting configuration of turbulators 21. Turbulators 21 can have a height (e) from the surface of plate 12 of between 10 and 30 mils (0.010 and 0.030 inches). This dimension (height (e)) can have varying dimension, and an actual value depends on construction method. For example, when casting, a minimum height (e) is about 0.010 inches. If machined or chemically etched, then turbulators 21 can be much smaller with a much reduced height (e). Similarly, there is no physical upper limit to the height (e). For a very large heat exchanger, turbulators could of course be proportionally larger. Typically, however, for best performance, it has been found that the non-dimensional ratio e/H, where H (FIG. 2) is passage height, is a meaningful factor, and in one non-limiting configuration, this ratio e/H can be in a range of 0.10-0.30 (10-30%).

Another dimension of relevance is the distance or pitch (P) from one turbulator to the next. Pitch (P) can be between 0.050 inches and 0.300 inches, and in one non-limiting configuration, a ratio of pitch to height (P/e) can be between 5 and 10.

The shape of turbulators 21 is also pertinent to establishing the desired flow characteristics. The cross section of FIG. 5 shows the shape of turbulators 21 in one non-limiting configuration. Turbulators 21 as shown in FIG. 5 have a square full-round shape, that is, the square full round shape is defined by a top surface 32 and two side surfaces 34, wherein transition or tip radius 36 (also referred to as a top fillet) between the top surface 32 and the two side surfaces 34 is rounded, and wherein transition or root fillet 38 from the two side surfaces 34 to the upper or lower flow surface 18, 20 of plate 12 is rounded. In one non-limiting configuration, a square full-round turbulator 21 has a cross section such that the width (w) of the turbulator, minus the root fillets 38, is equal to the overall turbulator height (e). The tip radius or top fillet 36 is equal to one-half of the turbulator height (e/2). The radius of the root fillet 38 is a maximum of one-half of the turbulator height (e/2). The minimum radius of the root fillet 38 is dependent on the manufacturing method but is typically about 0.003 inches, and in one non-limiting configuration can be between 0.003 inches and 0.005 inches. While it is possible for the radius of tip radius 36 to be 0, leading to a sharp edge, overall performance tends to be negatively impacted.

Figure 10:
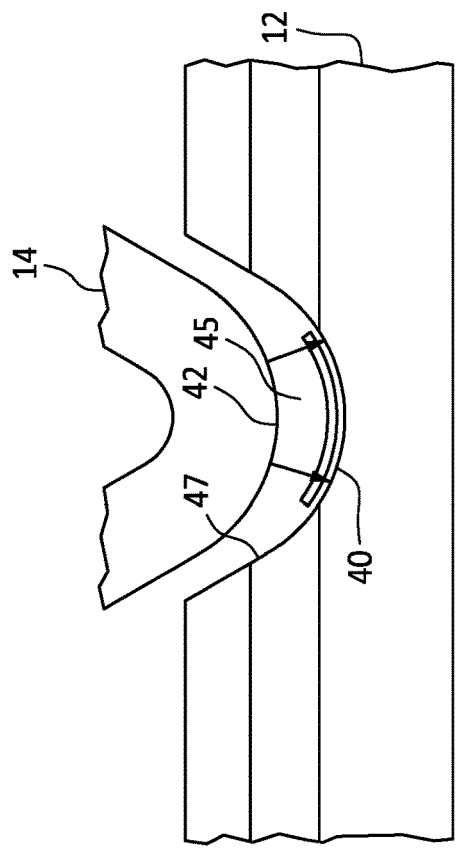
FIG. 10 illustrates interaction between a ridge of a fin pack and a groove of a lower wall as disclosed herein.

FIGS. 6 and 7 further illustrate another aspect of the present disclosure wherein plates 12 have a groove 40 positioned along the plate 12 to accept the corner or ridge 42 of fin pack 14 (also illustrated in greater scale in FIGS. 9 and 10). Interaction of the ridge 42 of fin pack 14 and groove 40 as disclosed herein is further illustrated in FIG. 10 below.

Turning now to FIGS. 8 and 9, flow characteristics that are generated by the heat exchanger of the present disclosure are discussed. FIG. 8 is a schematic illustration of a flow vortex characteristic in a triangular flow passage as disclosed herein. FIG. 8 schematically represents turbulators in zone 44 defined by the broken line in the drawing along the base of the triangular flow passage 16. The combination of turbulators 21 and angling of walls 15 generate a vortex flow as schematically illustrated in FIG. 8, specifically a counter rotating vortex pair, and such a flow advantageously serves to enhance heat transfer without significant pressure drop or delta P. For the configuration illustrated, centerline 46 bisecting the base of the triangle separates the two counter rotating vortex flows. The highest Nusselt numbers in a flow analysis are found to be along the centerline 46 of the primary surface (plate 12 with turbulators). The next highest Nusselt numbers are on the side wall or walls 15 of fin pack 14. Surfaces at the upper vertex of the flow passage also show elevated Nusselt numbers. It is also found that heat transfer augmentation does not degrade along the passage length in this configuration.

Typically, Nusselt numbers will peak, then degrade, but this is also not the case in the present configuration.

Referring also to FIG. 9, this configuration results in a high HTC at the base of the triangular flow passage 16, with medium HTC along the walls 15 and low HTC in the fin pack corners. This serves advantageously to create high HTC areas along almost the entire surface of plates 12, which improves HTC performance.

FIG. 10 illustrates interaction between groove 40 in plate 12 and a downwardly oriented ridge 42 of fin pack 14. Groove 40 is machined or otherwise provided into plate 12 such that a thermal contact line 45 is defined between ridge 42 and a machined, arcuate shaped section 47 of plate 12. A layer of braze is shown in ridge 42, for securing ridge 42 in groove 40. Further, during compression of the heat exchanger, groove 40 formed in this manner will help to support fin pack 14 during such compression. The configuration of groove 40 with ridge 42 as disclosed herein interacts such that a compression load will be transferred to the mating surface of these structures. This enhances bond quality and makes it possible to utilize diffusion bonding via FAST (Field Assisted Sintering Technique), or SPS (Spark Plasma Sintering).

Figure 11:
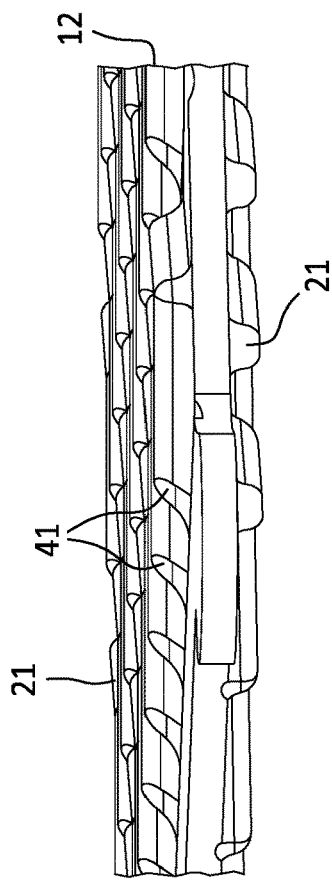
FIGS. 11-13 further illustrate details of an upper or lower wall as disclosed herein.
Figure 12:
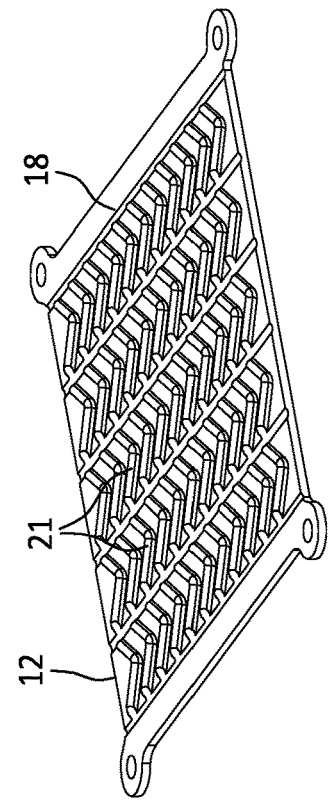
Figure 13:
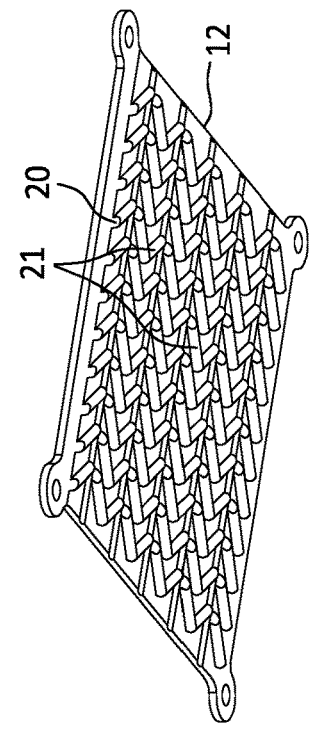

FIGS. 11-13 further illustrate features of plate 12 as disclosed herein. FIG. 11 shows a plate 12 having turbulators 21 on both sides of plate 12, and also further illustrates surfaces 41 defining grooves 40. FIG. 12 further illustrates turbulators 21 on upper surface 18 of a plate 12, and FIG. 13 illustrates turbulators 21 on the lower or bottom surface 20 of plate 12. It can be seen that the turbulators are arranged in transverse direction to each other, such that turbulators 21 on upper surface 18 are configured for flow in one direction, and turbulators 21 on lower surface 20 are configured for flow in a second direction transverse to the first direction.

Figure 16:
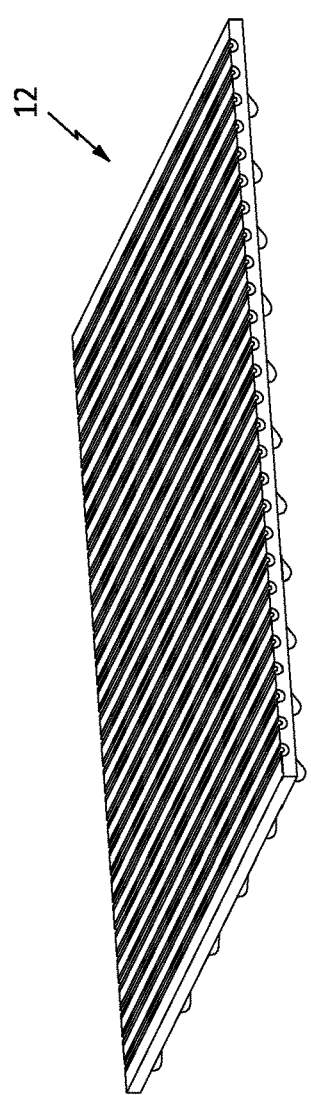
FIGS. 15 and 16 illustrate details of an upper or lower wall as disclosed with respect to the embodiment of FIG. 14.
Figure 15:
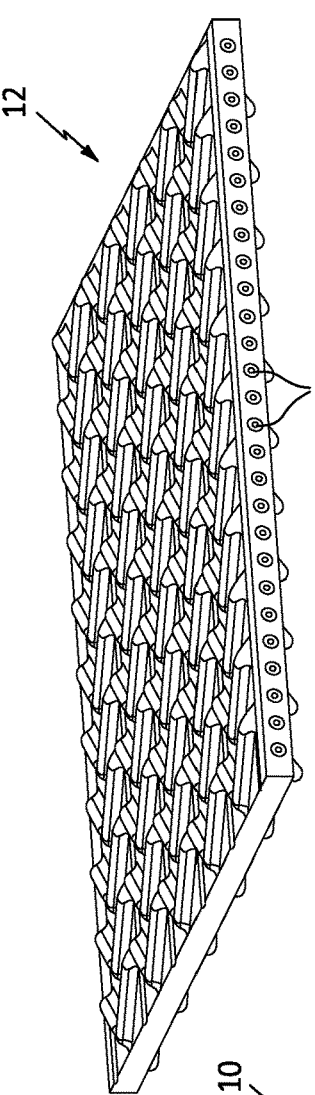
Figure 14:
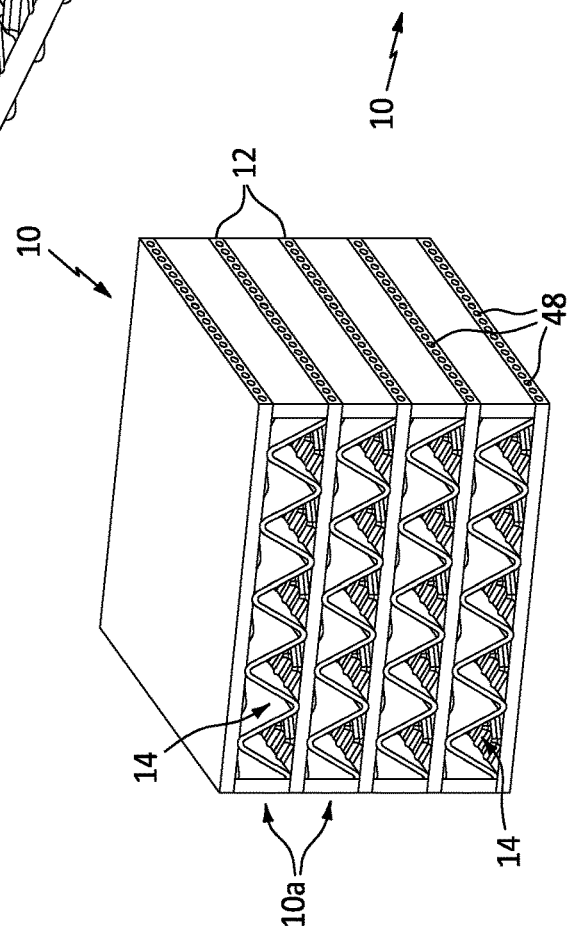
FIG. 14 illustrates an alternate non-limiting configuration of a heat exchanger as disclosed herein.

FIG. 14 illustrates a further non-limiting configuration wherein heat exchanger layers 10a are positioned for flow all in one direction, and wherein plates 12 have internal flow passages or channels 48, for example for liquid or other fluid flow, that flow transverse to flow direction in fin packs 14 of heat exchanger layers 10a. Heat exchanger layers 10a in this configuration are as discussed previously. However, in this configuration, plates 12 can have a series of fluid flow passages 48 defined through plates 12, as also illustrated in FIGS. 15 and 16, for example for carrying liquid, and the flow direction through plates 12 can again be transverse to the direction of flow in heat exchanger layers 10a. FIGS. 15 and 16 show a side view and cross-sectional view intended to help illustrate passages 48. These passages 48 can be straight flow (as illustrated in the sectional view of FIG. 16) or serpentine flow.

Plates 12 can be cast or forged, and turbulators can be incorporated into cast plates using fine detail ceramic materials for the casting. When plates are forged, turbulators can then be machined into the structure, and grooves can be machined or ground into plates as well. In this case, the two halves of the plates will need to be bonded, for example via braze or diffusion bonding. An alternative method to casting is to utilize FAST/SPS to generate the plate 12, complete with internal passages 48, via the solidification of powdered metal. Of course, these are non-limiting examples of methods for manufacturing plates 12, and others would be available to persons of skill in the art.

Suitable materials for plates 12 include iron alloys (stainless steel) or nickel-based alloys (Inconel, Hastaloy, Nickel super alloys). Further, plate 12 can ideally have a thickness (not counting turbulators) of between 0.005 inches and 0.050 inches. When plates are being cast, one method of investment casting that is well suited to the present disclosure involves using a ceramic mold into which metal is poured, rather than a conventional investment casting in which a ceramic shell is formed around a wax part. This can help to provide a heat exchanger with good structural stability without excessively thick walls.

Suitable materials for fin pack 14 include iron alloys (stainless steel) or nickel-based alloys (Inconel, Hastaloy, nickel super alloys). Further, fin packs 14 can be manufactured from sheet metal or other materials, and folded into the desired structure, or can be manufactured in other manners.

The heat exchangers disclosed herein are light weight and high-power structures that can find use in numerous commercial and other applications.

When manufacturing a heat exchanger as disclosed herein, a fin pack 14 is set into place on a lower plate 12. Fin pack 14 can be so placed with ridges 42 supported in grooves 40 of lower plate 12. As discussed above, braze or other bonding material can be placed in the space along contact line 45.

A top plate 12 and side bars 22 are then added, with ridges 42 of fin pack 14 also engaged in grooves 40 of the upper plate 12, and optionally with braze along contact line 45, and the components can then be bonded together, for example via brazing, diffusion bonding, or other techniques such as FAST (Field Assisted Sintering Technique), or SPS (Spark Plasma Sintering).

Placement of braze material followed by bonding as outlined above produces a resulting structure that minimizes distortion when loaded for FAST bonding. The various methods of joining the plates and side bars as discussed above are collectively referred to herein as bonding.

Figure 17:
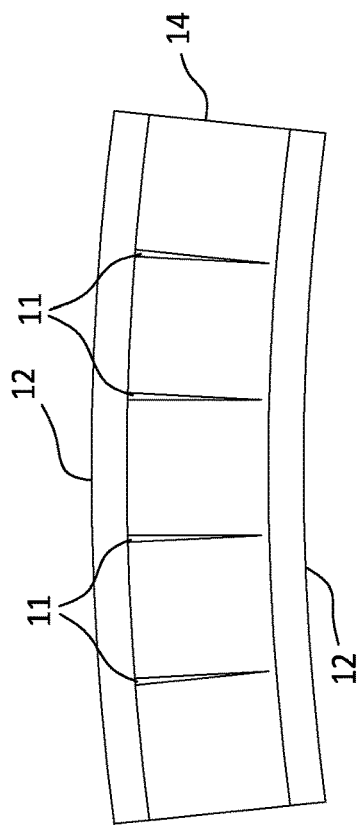
FIG. 17 schematically illustrates an arcuate embodiment of a heat exchanger.

It should be appreciated that while the present disclosure is made in terms of a flat heat exchanger structure, the subject matter disclosed herein also works well with an arcuate structure that would be well suited to annular placement. FIG. 17 schematically illustrates an embodiment of such a structure wherein an arcuate heat exchanger 10 is accomplished by incorporating bending structures such as notches 11 into fin pack 14 so that the structure can better be able to bend and thereby be placed between plates 12 that can be curved as shown, with turbulators formed on their curved surfaces to define the triangular flow paths as described herein.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit from the subject matter disclosed herein.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A heat exchanger element, comprising:
upper and lower walls defining upper and lower flow surfaces of a flow path;
turbulators on the upper and lower flow surfaces; and
a fin pack between the upper and lower surfaces, the fin pack comprising alternating angled walls extending between the upper and lower surfaces to define triangular flow passages in the flow path between the upper and lower walls, wherein the turbulators extend into the triangular flow paths, wherein the alternating angled walls define upper and lower ridges where adjacent walls meet, and wherein the upper and lower flow surfaces have grooves for receiving the upper and lower ridges, and wherein the turbulators have end surfaces at the grooves that extend from the grooves along the upper and lower ridges wherein the turbulators are in the shape a chevron, a broken-v, or combinations thereof.

2. The heat exchanger of claim 1, further comprising side walls extending between the upper and lower walls to collectively define the flow path.

3. The heat exchanger of claim 1, wherein the turbulators are oriented along a centerline of the triangular flow passages defined by adjacent walls of the fin pack and the upper or lower surface.

4. The heat exchanger of claim 1, wherein arms of the chevron or the broken-V are centered along the centerline of the triangular flow passages, and define an angle between the arms of between 60 and 120°.

5. The heat exchanger of claim 4, wherein the angle is measured facing downstream with respect to flow through the triangular flow passages.

6. The heat exchanger of claim 1, wherein the turbulators are defined by at least one ridge having a square, full-round shape.

7. The heat exchanger of claim 6, wherein the square, full-round shape is defined by a top surface and two side surfaces, wherein transition between the top surface and the two side surfaces is rounded, and wherein transition from the two side surfaces to the upper or lower flow surface is rounded.

8. The heat exchanger of claim 7, wherein a distance between the two side surfaces defines a width (w) of the turbulator, and the width is equal to a turbulator height (e), and wherein the transition from the two side surfaces to the top surface has a top fillet radius equal to one-half of the turbulator height (e/2).

9. The heat exchanger of claim 1, wherein the turbulators have a turbulator height to passage height ratio, e/H, between 0.10 and 0.30.

10. The heat exchanger of claim 1, wherein a ratio of pitch (P) of the turbulators in a flow direction to height (e) of the turbulators (P/e) is between 5 and 10.

11. The heat exchanger of claim 1, wherein the alternating angled walls define an angle between adjacent walls of between 45 and 75 degrees.

12. The heat exchanger of claim 1, wherein the alternating angled walls define an angle between adjacent walls of between 50 and 70 degrees.

13. The heat exchanger of claim 1, wherein the upper and lower walls contain passages for further fluid flow.

14. A heat exchanger stack, comprising a plurality of heat exchange layers defining heat exchange fluid flow passages, wherein at least one of the heat exchange layers comprises the heat exchanger of claim 1.

15. A method for making a heat exchanger, comprising the steps of:
- placing a fin pack comprising alternating angled walls on a lower wall having turbulators, lower grooves being defined in the lower wall to receive lower ridges defined by adjacent walls of the fin pack;
- placing an upper wall on the fin pack, upper grooves being defined in the upper wall to receive upper ridges defined by adjacent walls of the fin pack;
- placing side walls between the upper wall and the lower wall to define an assembled heat exchanger; and
- bonding the assembled heat exchanger;
- having the angled walls define triangular flow paths;
- having the turbulators extend into the triangular flow passages;
- having the turbulators have end surfaces at the grooves that extend from the grooves along the upper and lower ridges; and
- having the turbulators in the shape a chevron, a broken-v, or combinations thereof.

16. The method of claim 15, further comprising placing braze in the upper and lower grooves before the bonding step.

17. The method of claim 15, wherein the upper wall and the lower wall are forged and then etched to produce the turbulators on flow surfaces of the upper wall and the lower wall.

18. The method of claim 17, further comprising grinding or machining the upper groove and the lower groove into the upper wall and the lower wall.

* * * * *